United States Patent
Barnes et al.

(10) Patent No.: US 7,213,449 B2
(45) Date of Patent: May 8, 2007

(54) FLAT TRACK CHASSIS DYNAMOMETER

(75) Inventors: Ken Barnes, Northville, MI (US); Juergen Neugebauer, Rochester Hills, MI (US)

(73) Assignees: AVL North America Inc., Plymouth, MI (US); AVL Zoellner GmbH, Kiel (DE)

( * ) Notice: Subject to any disclaimer, the term of this patent is extended or adjusted under 35 U.S.C. 154(b) by 0 days.

(21) Appl. No.: 10/914,501

(22) Filed: Aug. 9, 2004

(65) Prior Publication Data

US 2005/0028584 A1 Feb. 10, 2005

Related U.S. Application Data

(60) Provisional application No. 60/493,266, filed on Aug. 7, 2003.

(51) Int. Cl.
*G01M 15/00* (2006.01)
(52) U.S. Cl. .................... 73/117; 73/116; 73/117.1; 73/117.2; 73/117.3; 73/123; 73/126; 73/127; 73/670; 73/862.041; 73/862.08; 73/862.191
(58) Field of Classification Search ............... 73/117, 73/117.2, 123, 126, 127, 670, 862.041, 862.08, 73/862.191
See application file for complete search history.

(56) References Cited

U.S. PATENT DOCUMENTS

| | | | | |
|---|---|---|---|---|
| 3,520,180 A | * | 7/1970 | Ris et al. ..................... | 73/670 |
| 3,585,855 A | * | 6/1971 | Albertson ..................... | 73/117 |
| 3,750,464 A | * | 8/1973 | Ostrander ..................... | 73/117 |
| 3,763,699 A | * | 10/1973 | Sangster ..................... | 73/117 |
| 3,914,990 A | * | 10/1975 | Borg ......................... | 73/670 |
| 4,455,866 A | * | 6/1984 | Barrigar ..................... | 73/117 |
| 4,991,430 A | * | 2/1991 | Kaizu ........................ | 73/117 |
| 4,998,436 A | * | 3/1991 | Kaizu et al. ................. | 73/117 |
| 5,111,685 A | * | 5/1992 | Langer ....................... | 73/117 |
| 5,136,879 A | * | 8/1992 | Kaizu et al. ................. | 73/117 |
| 5,241,854 A | * | 9/1993 | Kaizu et al. ................. | 73/117 |
| 5,337,600 A | * | 8/1994 | Kaneko et al. ............... | 73/117 |
| 5,375,460 A | * | 12/1994 | La Belle ..................... | 73/117 |
| 5,689,092 A | * | 11/1997 | Wurz et al. .................. | 177/145 |
| 2005/0120783 A1 | * | 6/2005 | Namoun ...................... | 73/117 |

* cited by examiner

*Primary Examiner*—Edward Lefkowitz
*Assistant Examiner*—Freddie Kirkland, III
(74) *Attorney, Agent, or Firm*—Carlson, Gaskey & Olds, PC

(57) ABSTRACT

A chassis dynamometer for use with a test vehicle such as a snowmobile is provided. First and second spaced apart rolls support the test vehicle. A belt is arranged around the first and second rolls and rotationally couples the rolls to one another. The belt includes an outer surface on a test side of the belt for supporting the test vehicle. The belt reduces slipping of the track on the dynamometer. The belt receives inputs from the test vehicle. A processor quantifies the inputs from the test vehicle. A platform is arranged between the first and second rolls beneath the belt to maintain engagement of the track with the belt. The platform includes a load cell for detecting a longitudinal load imparted to the platform by the belt.

8 Claims, 3 Drawing Sheets

FLAT TRACK CHASSIS DYNAMOMETER

This application claims priority to Provisional Application Ser. No. 60/493,266, filed Aug. 7, 2003.

BACKGROUND OF THE INVENTION

Chassis dynamometers are widely used to test and evaluate the performance of a vehicle. Chassis dynamometers account for transmission losses of the entire drive train and measure the power and other variables at the wheels under various loading conditions. Inertia-type chassis dynamometers effectively measure the transient vehicle output levels by causing a dynamometer roll to accelerate at a rate proportional to the engine output. An addition of a motor/generator may act as a driver to measure drive train parameters during static conditions.

Personal recreational or off-road vehicles are tested on chassis dynamometers, similar to other vehicles, to measure performance and obtain information that will be used in the calibrating the engine and other drive train components. The drive train components are then calibrated, for example, by programming an engine control module. For example, air fuel ratios at specific load points may be optimized by utilizing the information obtained from the dynamometer.

Typically, vehicles such as snowmobiles are tested by driving a single roll or multiple small rolls with the track of the snowmobile, which may be undesirable. Specifically, since there is only line contact between the track and the rolls, the track will slip relative to the rolls especially during hard acceleration. As a result, the vehicle output measured by the dynamometer will be inaccurate.

What is needed is a chassis dynamometer that reduces slipping between the snowmobile tracks and the chassis dynamometer to ensure that more accurate test data is gathered.

SUMMARY OF THE INVENTION AND ADVANTAGES

The present invention provides a chassis dynamometer for use with a test vehicle such as a snowmobile. However, the same dynamometer can be used with four wheel ATV's. First and second spaced apart rolls support the test vehicle. A belt is arranged around the first and second rolls and rotationally couples the rolls to one another. The belt includes an outer surface on a test side of the belt for supporting the test vehicle. The test side receives inputs from the test vehicle, in the case of a snowmobile, from the track. Using a belt that supports more of the track reduces slipping. A processor quantifies the inputs from the test vehicle to provide performance information of the vehicle to provide performance information of the vehicle.

A platform is arranged between the first and second rolls beneath the belt to prevent the belt from sagging and ensure the belt maintains engagement with the track. An underside of the belt is supported by the platform. The platform may include antifriction rolls and/or a belt spacing device such as air passages for providing pressurized air between the platform and belt to reduce friction. Cooling passages may be provided on the platform to maintain the platform temperature within a desired temperature range.

The platform includes a load cell for detecting a longitudinal load imparted to a movable plate of the platform by the belt. The load cell is used to account for parasitic losses between the belt and platform during calibration. The load cell also measures the load on the platform from the belt during the test procedure to adjust the vehicle performance information of the test vehicle.

Accordingly, the present invention provides a chassis dynamometer that reduces slipping between the snowmobile tracks and the chassis dynamometer to ensure that more accurate test data is gathered.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
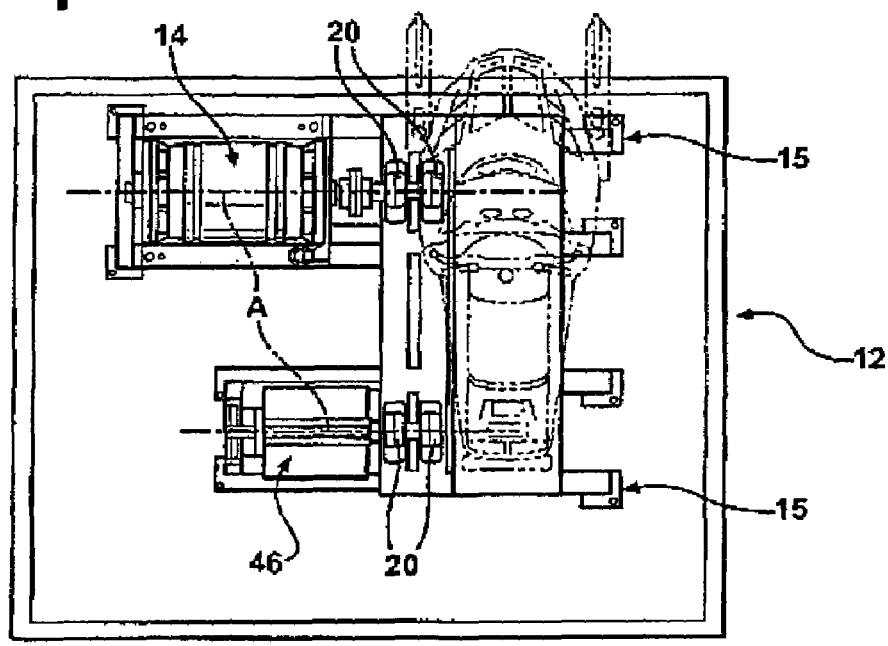
FIG. 1 is a top elevational view of the inventive chassis dynamometer.
Figure 2:
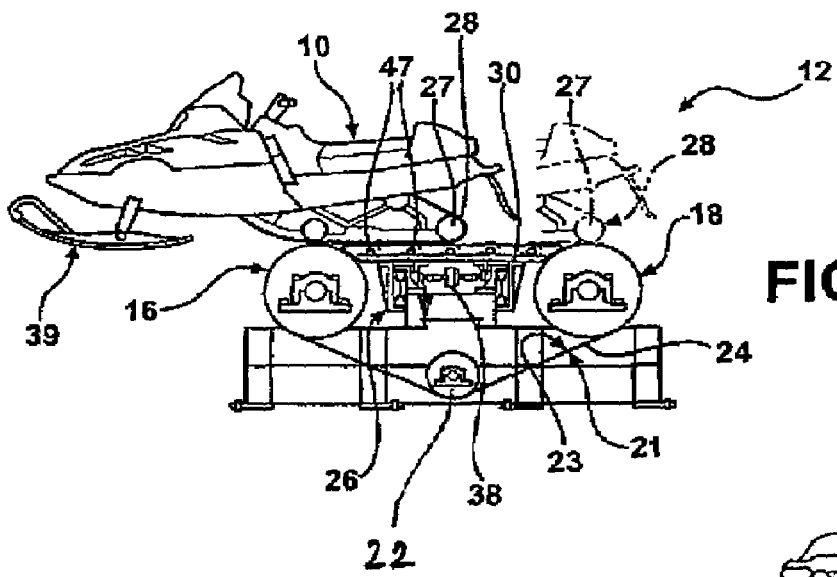
FIG. 2 is a side elevational view of the chassis dynamometer shown in FIG. 1.
Figure 3:
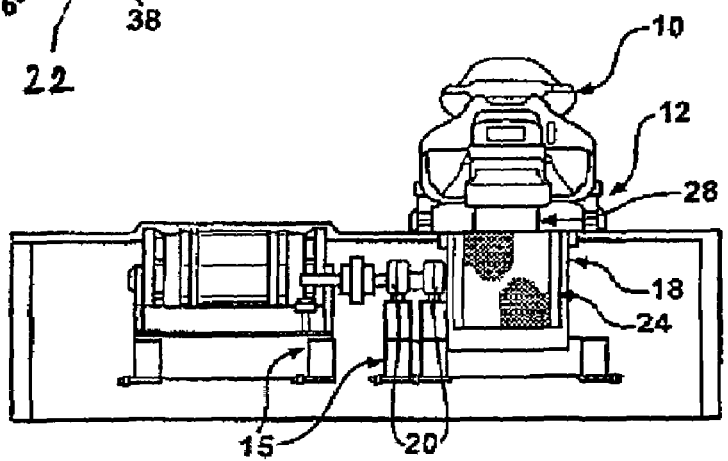
FIG. 3 is a rear elevational of the chassis dynamometer shown in FIG. 1.

Referring to FIGS. 1–3, a test vehicle 10 such as a snowmobile may be supported by the inventive dynamometer 12. The dynamometer 12 includes a motor/generator 14 supported on a frame 15. The frame 15 may comprise numerous structural members welded or bolted together to provide the support for the dynamometer components and the test vehicle 10. Spaced apart first 16 and second 18 rolls are supported by the frame 15. The first roll 16 is rotationally connected to the motor/generator 14. The first roll 16 is driven by the motor/generator 14 in a known manner. Information from the motor/generator 14 is gathered to calibrate the chassis dynamometer prior to the test and collect vehicle test data, as is known in the art. The first and second roll 16 and 18 are rotatable about spaced apart axes A and support a belt 24.

The first 16 and second 18 rolls are supported in a cantilever relationship by bearing blocks 20. The bearing blocks 20 are arranged on one side of the rolls 16 and 18 so that the other side of the rolls 16 and 18 are unobstructed by any bearing blocks. This enables the belt 24 to be easily changed without disassembling large components of the dynamometer 12 by relieving the tension on the belt 24 and sliding the belt 24 off the rolls 16 and 18 from the unobstructed side.

A steerable tension roller 22 is arranged beneath the rolls 16 and 18 to maintain tension and alignment of a belt 24 that is wrapped about the rolls 16 and 18 and the tension roller 22. The belt 24 is used to increase the contact area between the track 28 and the dynamometer to reduce slipping. Track 28 of the snowmobile imparts inputs to the rolls 16, 18 and the belt 24 which are indicative of vehicle performance.

The belt 24 is preferably a multi-layered material that is relatively inexpensive to replace. The belt includes an outer surface on a test side 21 that supports the track 28. The outer surface may be a leather material that ensures that the input from the track 28 is transmitted to the belt 24 with minimal slipping. An underside 23 of the belt 24 is in engagement with the rolls 16 and 18 and the tension roller 22.

The track 28 between the rolls 16 and 18 are supported by a platform 26 arranged between the rolls 16 and 18, otherwise, the belt 24 would sag thereby reducing the contact area. However, friction is generated between the belt 24 and platform 26 that must be accounted. In order to obtain accurate performance information on the vehicle, all of the loads and parasitic losses must be accounted. That is, the frictional drag characteristic on the platform 26 from the belt 24 is significant enough that the accuracy of the dynamometer information may be compromised. Specifically, a plate 30 of the platform 26 is used to support the weight of the test vehicle and to account for the frictional drag to improve the load control accuracy during calibration and during the vehicle test so that accurate performance information is obtained.

In one example, wheels 27 that drive the track 28 are arranged such that the front and rear wheels are approximately vertically oriented above the rotational axes A of the first and second rolls 16 and 18 for longer, two seat snowmobiles (shown in phantom in FIG. 2). This ensures that track 28 in front of and behind of the front and rear wheels 27 does not hang over the rolls 16 and 18 reducing the contact area between the track 28 and belt 24 thereby reducing the accuracy of the test. It is also desirable that the front and rear wheels 27 are not arranged significantly inboard of the axes A in order to minimize the weight supported by the platform 26. However, for shorter snowmobiles (shown in solid in FIG. 2), the front wheel many only be arranged over the first roll 16.

Figure 7:
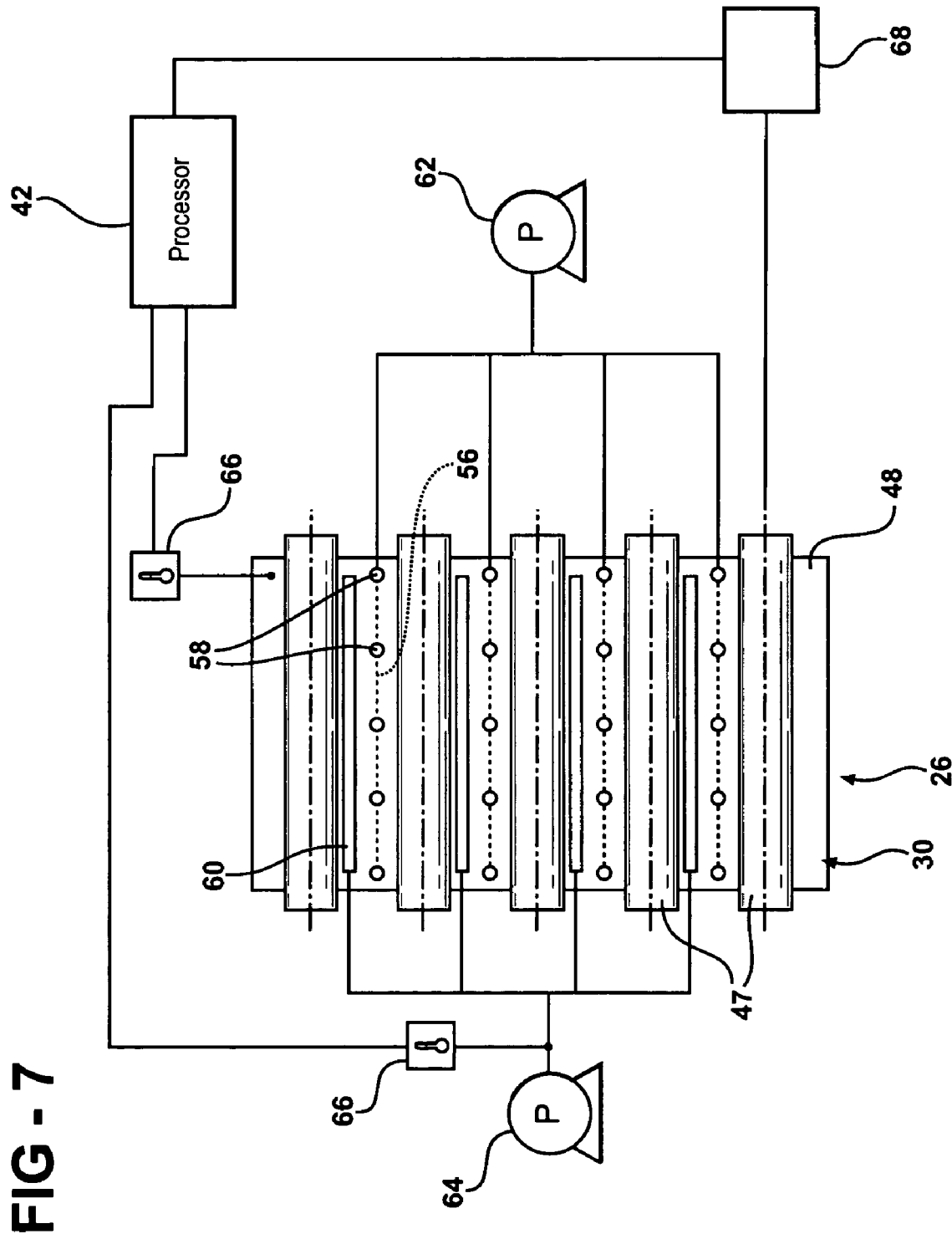
FIG. 7 is a top elevational view of the platform shown in FIG. 4.

Referring to FIG. 7, the platform 26 includes a water-cooled plate 30 to dissipate heat generated from the friction of the belt 24 as it is driven across the plate 30 by the track 28. The plate 30 includes an upper surface 48 that directly or indirectly supports the underside 23 of the belt 24. Cooling passages 60 in the plate 30 receive a cooling fluid from a pump 64 to reduce the negative effects of increased temperate between the belt 24 and platform 26 interface during operation of the dynamometer 12. A temperature sensor 66 may be used to sense the temperature of the cooling fluid to ensure that the temperature of the platform 26 remains within a desired temperature range. In addition to, or in place of the cooling temperature sensor 66, another temperature sensor 66 may be employed to sense the temperature of the upper surface 48, which more closely corresponds to the temperature of the belt 24. The temperature sensors 66 communicate with a processor 42. The processor 42 may be hardware or software and may include multiple components that communicate with one another.

A belt support device may be used to reduce the friction between the belt 24 and plate 30. Air passages 56 having apertures 58 in the plate may provide pressurized air from a pump 62 to lift the belt 24.

Figure 4:
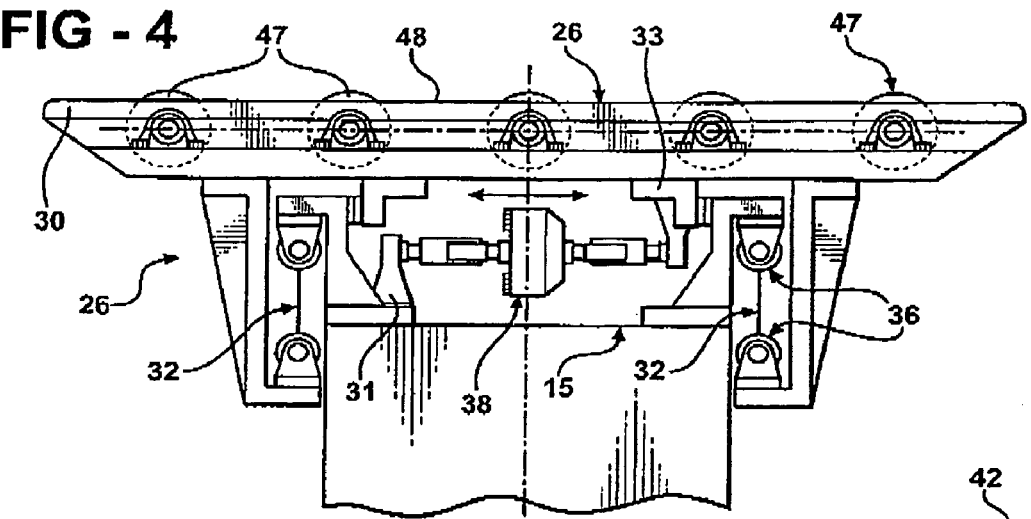
FIG. 4 is a side elevational view of an inventive platform for measuring longitudinal load from a belt.
Figure 5:
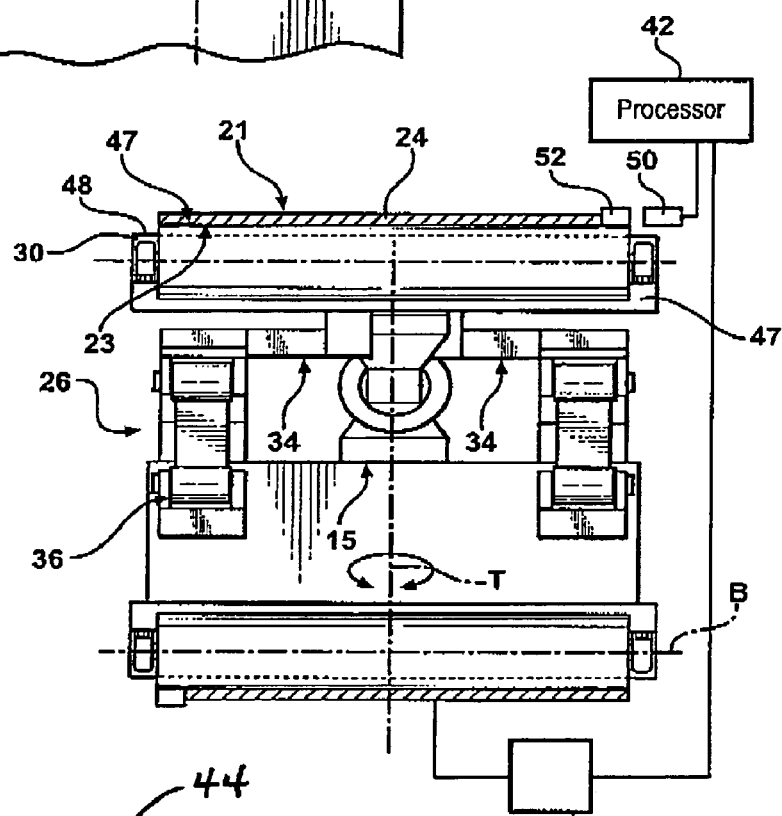
FIG. 5 is a rear elevational view of the platform shown in FIG. 4.

In some applications, it may be desirable to use a series of small conveyor style rollers 47 on the platform 26 to further reduce the frictional drag, as shown in FIGS. 4, 5 and 7. An actuator 68 can be used to raise and lower the rollers 47 to adjust the friction between the belt 24 and platform 26. The processor 42 communicates with the actuator 68 to adjust the rollers 47 as desired.

Referring to FIG. 5, the rolls 16 and 18 and tension roller 22 are slightly crowned to better ensure that the belt 24 stays centered on the rolls 16 and 18 throughout the test procedure. A proximity sensor 50 communicates with the processor 42 to monitor the lateral position of the belt 24. The proximity sensor 50 cooperates with a portion 52 of the belt to determine the belt position. The tension roller 22 is steerable about a vertical axis T by an actuator 54 that communicates with the processor 42. The tension roller 22 adjusts the lateral belt position to a desired position in cooperation with the proximity sensor 50.

Referring to FIGS. 4 and 5, fore/aft flexure supports 32 are arranged between the plate 30 and the frame 15 to allow limited fore/aft movement of the plate. The flexure supports 32 are connected to the plate 30 and frame 15 by connections 36 respectively at movable and fixed members 33 and 31. Lateral flexure supports 34 are arranged between the plate 30 and frame 15 to prevent twisting of the plate 30 during testing of the vehicle 10 so that the frictional load is maintained in a longitudinal orientation. The flexure supports 32 and 34 may be provided by a thin piece of spring steel that permits fore/aft movement so that the frictional force may be measured.

A load cell 38 is arranged longitudinally and is connected between the plate 30 and the frame 15. The load cell 38 measures the load generated by the frictional drag across the plate 30.

Figure 6:
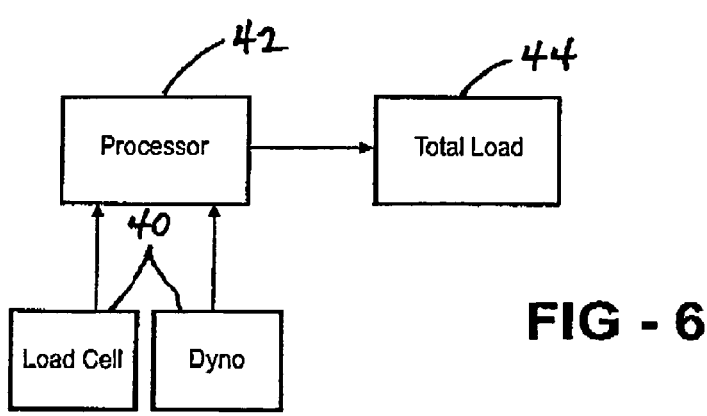
FIG. 6 is a schematic view of an inventive measurement procedure.

Referring to FIG. 6, in operation, the skis 39 of the snowmobile 10 are clamped to the frame. The vehicle 10 is tied down in a manner known in the art to maintain desired engagement between the tracks 28 and the belt 24. Information from the dynamometer 12, as indicated at blocks 40, is received by a processor 42. The information from the dynamometer is incomplete and results in inaccurate vehicle performance information since it does not account for the frictional drag on the platform 26. Information from the load cell 38 is sent to the processor 42 so that the processor 42 may account for the frictional drag and determine a total load 44 that accurately reflects load information relating to the performance of the test vehicle 10.

The inventive dynamometer 12 also has the capability of testing all-terrain, single live axle vehicles by engaging a clutch 46. Typical dynamometers are dedicated in that they can only test either a snowmobile or an ATV. The inventive dynamometer uses two rolls 16 and 18 to provide this flexibility. The belt 24 can easily be removed from the rolls 16 and 18, as described previously. However, when testing a snowmobile using two rolls the platform 26 must be employed to more accurately control the load on the snowmobile. The platform 26 accounts for the frictional drag so that the information measured using typical dynamometer sensors may supplemented and/or adjusted.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A chassis dynamometer for use with a test vehicle comprising:
   first and second spaced apart rolls for supporting the test vehicle;
   a belt arranged around the first and second rolls rotationally coupling the first and second rolls, the belt having an outer surface for supporting the test vehicle and for receiving inputs from the test vehicle;
   a processor for quantifying the inputs from the test vehicle; and a frame, the first and second rolls having opposing sides, bearing blocks supported on the frame and proximate to one of the sides of the first and second rolls, the bearing blocks supporting the first and second rolls for rotation about their respective axes, the opposite side unobstructed by the bearing blocks along the axes permitting removal of the belt.

2. A chassis dynamometer for use with a test vehicle comprising:

first and second spaced apart rolls for supporting the test vehicle;

a belt arranged around the first and second rolls rotationally coupling the first and second rolls, the belt having an outer surface for supporting the test vehicle and for receiving inputs from the test vehicle;

a platform arranged between the first and second rolls beneath the belt and opposite the outer surface;

a processor for quantifying the inputs from the test vehicle including parasitic losses attributable to an interface between the belt and the platform;

a tension roller is spaced from said first and second rolls, the belt arranged around the first and second rolls and the tension roller rotationally coupling the first and second rolls and the tension roller; and wherein a sensor detects a lateral position of the belt relative to a desired belt position, and an actuator steers the tension roller in response to the lateral position to maintain the desired belt position.

3. A chassis dynamometer for use with a test vehicle comprising:

first and second spaced apart rolls for supporting the test vehicle;

a belt arranged around the first and second rolls rotationally coupling the first and second rolls, the belt having an outer surface for supporting the test vehicle and for receiving inputs from the test vehicle;

a platform arranged between the first and second rolls beneath the belt and opposite the outer surface;

a processor for quantifying the inputs from the test vehicle including parasitic losses attributable to an interface between the belt and the platform;

a belt spacing device urges the belt away from a horizontal plate of the platform, the plate having an associated sensor for measuring a load imparted on the plate by the belt; and wherein the belt spacing device includes multiple rollers having circumferences extending above a support surface of the platform adjacent to the belt.

4. A chassis dynamometer for use with a test vehicle comprising:

first and second spaced apart rolls for supporting the test vehicle;

a belt arranged around the first and second rolls rotationally coupling the first and second rolls, the belt having an outer surface for supporting the test vehicle and for receiving inputs from the test vehicle;

a platform arranged between the first and second rolls beneath the belt and opposite the outer surface;

a processor for quantifying the inputs from the test vehicle including parasitic losses attributable to an interface between the belt and the platform;

a belt spacing device urges the belt away from a horizontal plate of the platform, the plate having an associated sensor for measuring a load imparted on the plate by the belt; and wherein the belt spacing device includes an air passage having an aperture in a support surface of the platform adjacent to the belt, the aperture providing pressurized air between the platform and the belt.

5. A chassis dynamometer for use with a test vehicle comprising:

first and second spaced apart rolls for supporting the test vehicle;

a belt arranged around the first and second rolls rotationally coupling the first and second rolls, the belt having an outer surface for supporting the test vehicle and for receiving inputs from the test vehicle;

a platform arranged between the first and second rolls beneath the belt and opposite the outer surface, the platform supporting the belt and receiving a longitudinal input from the belt;

a sensor detecting the longitudinal input; and a processor for quantifying the inputs and determining performance information of the test vehicle, wherein the platform includes a plate supported on a frame by flexure supports, the flexure supports permitting the platform to move longitudinally relative to the frame.

6. The chassis dynamometer according to claim 5, wherein the sensor is arranged between the plate and the frame, the sensor detecting the longitudinal movement of the platform.

7. A chassis dynamometer for use with a test vehicle comprising:

first and second spaced apart rolls for supporting the test vehicle;

a belt arranged around the first and second rolls rotationally coupling the first and second rolls, the belt having an outer surface for supporting the test vehicle and for receiving inputs from the test vehicle;

a platform arranged between the first and second rolls beneath the belt and opposite the outer surface, the platform supporting the belt and receiving a longitudinal input from the belt;

a sensor detecting the longitudinal input; and a processor for quantifying the inputs and determining performance information of the test vehicle, wherein the plate includes cooling passages for reducing the temperature of the plate.

8. A chassis dynamometer for use with a test vehicle comprising:

first and second spaced apart rolls for supporting the test vehicle;

a belt arranged around the first and second rolls rotationally coupling the first and second rolls, the belt having an outer surface for supporting the test vehicle and for receiving inputs from the test vehicle;

a platform arranged between the first and second rolls beneath the belt and opposite the outer surface, the platform supporting the belt and receiving a longitudinal input from the belt;

a sensor detecting the longitudinal input; and a processor for quantifying the inputs and determining performance information of the test vehicle, wherein a temperature sensor is associated with the platform for detecting a platform temperature.

* * * * *